US008731700B2

(12) United States Patent
Funaki

(10) Patent No.: US 8,731,700 B2
(45) Date of Patent: May 20, 2014

(54) DEVICE FOR DETERMINING BUILD-TO-ORDER PRODUCTION PROCESS, PROGRAM, SYSTEM FOR DETERMINING BUILD-TO-ORDER PRODUCTION PROCESS, AND METHOD FOR DETERMINING BUILD-TO-ORDER PRODUCTION PROCESS

(75) Inventor: Kenichi Funaki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 375 days.

(21) Appl. No.: 13/143,559

(22) PCT Filed: Jan. 7, 2009

(86) PCT No.: PCT/JP2009/050057
§ 371 (c)(1),
(2), (4) Date: Aug. 5, 2011

(87) PCT Pub. No.: WO2010/079589
PCT Pub. Date: Jul. 15, 2010

(65) Prior Publication Data

US 2011/0288670 A1 Nov. 24, 2011

(51) Int. Cl.
*G06F 19/00* (2011.01)

(52) U.S. Cl.
USPC .............................. 700/103; 705/28; 709/224

(58) Field of Classification Search
USPC .............................. 700/103; 705/28; 709/224
See application file for complete search history.

(56) References Cited

U.S. PATENT DOCUMENTS 6,882,892 B2 * 4/2005 Farrah et al. .................... 700/97
7,610,111 B2 * 10/2009 Lin et al. ....................... 700/101
2002/0087438 A1 * 7/2002 Kunieda et al. ................. 705/28
2003/0083762 A1 * 5/2003 Farrah et al. .................... 700/97
2006/0106477 A1 * 5/2006 Miyashita ...................... 700/103
2007/0073430 A1 * 3/2007 Govind et al. .................. 700/99
2007/0203606 A1 * 8/2007 Quarg ........................... 700/121
2007/0282474 A1 * 12/2007 Schmidt .......................... 700/99
2009/0319070 A1 * 12/2009 Morningred et al. ......... 700/103
2010/0106278 A1 * 4/2010 Retersdorf .................... 700/103

FOREIGN PATENT DOCUMENTS

JP 2002-099316 4/2002
JP 2002-202805 7/2002
JP 2002-290095 10/2002
JP 2003-345419 12/2003
JP 2006-331459 12/2006
JP 2007-004283 1/2007
JP 2007-213508 8/2007
JP 2008-003958 1/2008

OTHER PUBLICATIONS

JP Office Action for Japanese Patent Application No. 2010-545649, issued on Oct. 23, 2012.

* cited by examiner

*Primary Examiner* — Mohammad Ali
*Assistant Examiner* — Anthony Whittington
(74) *Attorney, Agent, or Firm* — Antonelli, Terry, Stout & Kraus, LLP.

(57) ABSTRACT

A build-to-order production process is determined in consideration of magnitude of demand. A lead time calculating section (122) calculates process-specific lead time proportional to the time at which the number of items required to produce the amount of demand for products which are periodically ordered is processed for each process of manufacturing a product and selects a process in the range in which the sum value after the calculated process-specific lead time is added to the travel time between the processes does not exceed the lead time permissible by the client as a build-to-order selection process.

12 Claims, 12 Drawing Sheets

| PRODUCT | DEMAND RATE | ALLOWABLE DELIVERY LEAD TIME |
|---|---|---|
| p | 100 UNITS/DAY | 10 DAYS |
| q | 70 UNITS/DAY | 7 DAYS |
| ⋮ | ⋮ | ⋮ |

| PRODUCT | ITEM | QUANTITY-PER |
|---|---|---|
| p | a | 1 |
| p | b | 1 |
| p | x | 1 |
| p | y | 1 |
| q | b | 1 |
| q | y | 1 |
| ⋮ | ⋮ | ⋮ |

| PRODUCT (113b) | ITEM (113c) | PROCESS (113d) | BATCH SIZE (113e) | CYCLE TIME (113f) | MANUFACTURING SHARE (113g) | PROCESSING TIME (113h) | LEAD TIME (113i) | PROCESSING RATE (113j) |
|---|---|---|---|---|---|---|---|---|
| p | x | j1 | 240 | 1 | 0. 5 | 6. 5 | 7 | 120 |
| p | y | j1 | 300 | 1 | 0. 3 | 4. 5 | 5 | 90 |
| q | y | j1 | 315 | 1 | 0. 2 | 4. 5 | 5 | 63 |
| p | a | j2 | 100 | 1 | 1. 0 | 2. 0 | 3 | 100 |
| ⋮ | ⋮ | ⋮ | ⋮ | ⋮ | ⋮ | ⋮ | ⋮ | ⋮ |

| From PROCESS (114b) | To PROCESS (114c) | TRANSIT TIME (114d) |
|---|---|---|
| j1 | j2 | 1 |
| j1 | j3 | 1 |
| j2 | j4 | 2 |
| j3 | j4 | 5 |
| j3 | j5 | 1 |
| j4 | j6 | 1 |
| j5 | j7 | 1 |
| ⋮ | ⋮ | ⋮ |

DEVICE FOR DETERMINING BUILD-TO-ORDER PRODUCTION PROCESS, PROGRAM, SYSTEM FOR DETERMINING BUILD-TO-ORDER PRODUCTION PROCESS, AND METHOD FOR DETERMINING BUILD-TO-ORDER PRODUCTION PROCESS

TECHNICAL FIELD

The present invention relates to a technique for selecting a process where a manufacture is performed after an order is received, from a process flow which specifies a sequence of processes for manufacturing a product.

BACKGROUND ART

In a business (a field of product) where demand varies drastically and customer needs are diversified, there is a make-to-order strategy which starts manufacturing after receipt of an order, as a countermeasure for reducing a risk of surplus inventory and occurrence of opportunity loss. However, in the case where a lead time for manufacturing a product is long, a start of production after receipt of an order may fail in meeting a deadline required by a customer. Considering the situation above, a measure as the following is generally taken; a delivery lead time permissible by the customer is figured out, a process range is assumed as a make-to-order process, the range allowing delivery within the delivery lead time even though manufacturing is started after receiving the order, and as for the process prior thereto, make-to-stock production is performed in advance.

Since it is typically conceivable that a manufacturing lead time and a customer-allowable lead time vary among products, a selection of the make-to-order process also vary among products.

In this regard, the patent document 1 provides a technique, for example, for obtaining from locations where inventory is maintainable, one point (a decoupling point) where a requested lead time and a supply lead time are balanced with respect to each product, between a site of material and a customer. A downstream process from the decoupling point is assumed as a process for manufacturing in response to receipt of an order.

Patent Document 1

Japanese Unexamined Patent Application No. 2006-331459

DISCLOSURE OF THE INVENTION

Problem to be Solved by the Invention

In the technique described in the patent document 1, a process for performing make-to-order is selectable for each product. However, a production lead time and a delivery lead time which are necessary for calculating the supply lead time are given as constants.

In this point of view, orders from a customer are typically placed in succession as a matter of fact. Therefore, it is required to have production capability which allows a supply of the product, while keeping up with such demand rate (demand rate: a quantity demanded per unit time), in order to achieve the make-to-order production.

However, in the conventional technique, the process for the make-to-order is determined according to magnitude of the lead time fixed in advance, and this may make the processing impracticable from the aspect of capacity.

In view of the situation above, an object of the present invention is to provide a technique which enables determination of the make-to-order process, in consideration of a scale of demand.

Means to Solve the Problem

In order to solve the problem above, the present invention calculates, with respect to each process for manufacturing a product, a process-specific lead time that is proportional to a time length for processing a quantity of an item required for producing a quantity demanded, as to the product whose order is received periodically, and compares the process-specific lead time with an allowable delivery lead time that is permitted by a customer.

By way of example, the present invention is directed to an apparatus for determining a make-to-order process, for selecting a process for manufacturing after receipt of an order of a product, from a process flow that specifies a sequence of processes for manufacturing the product, including, a storage section for storing demand master information for specifying an allowable delivery lead time that is permitted by a customer as a period from placing an order of the product to delivering thereof, and process network information for specifying a transit time of an item between the processes, and a control section, wherein, the control section performs processing of; calculating, with respect to each process for manufacturing the product, a process-specific lead time being proportional to a time length for processing a quantity of the item required for producing a quantity demanded, as to the product whose order is periodically received, calculating an additional value obtained by adding the process-specific lead time calculated for one process, and a transit time between the one process and a previous process of the one process, sequentially from the lowermost stream process to an upper stream process of the process flow, so as to specify the one process which makes the additional value equal to or less than the allowable delivery lead time that is specified by the demand master information, and selecting a process starting from the one process being specified, as the make-to-order process within the process flow.

Effect of the Invention

As described above, according to the present invention, it is possible to provide a technique which enables determination of the make-to-order process, in consideration of a scale of demand.

BRIEF DESCRIPTION OF DRAWINGS

FIG. 2 is a schematic diagram showing a demand master information table 111*a;*

FIG. 3 is a schematic diagram showing a parts list information table 112*a;*

FIG. 4 is a schematic diagram showing an item and process master information table 113*a;*

FIG. 5 is a schematic diagram showing a process network information table 114*a;*

DENOTATION OF REFERENCE NUMERALS

100 APPARATUS FOR DETERMINING MAKE-TO-ORDER PROCESS
110 STORAGE SECTION
111 DEMAND MASTER INFORMATION STORAGE AREA
112 PARTS LIST INFORMATION STORAGE AREA
113 ITEM AND PROCESS MASTER INFORMATION STORAGE AREA
114 PROCESS NETWORK INFORMATION STORAGE AREA
120 CONTROL SECTION
121 OVERALL CONTROL SECTION
122 LEAD TIME CALCULATING SECTION
123 PROCESSING RATE CALCULATING SECTION
124 MAKE-TO-ORDER PROCESS SELECTING SECTION
125 DISPLAY PROCESSING SECTION
130 INPUT SECTION
140 OUTPUT SECTION
150 COMMUNICATION SECTION

BEST MODE FOR CARRYING OUT THE INVENTION

Figure 1:
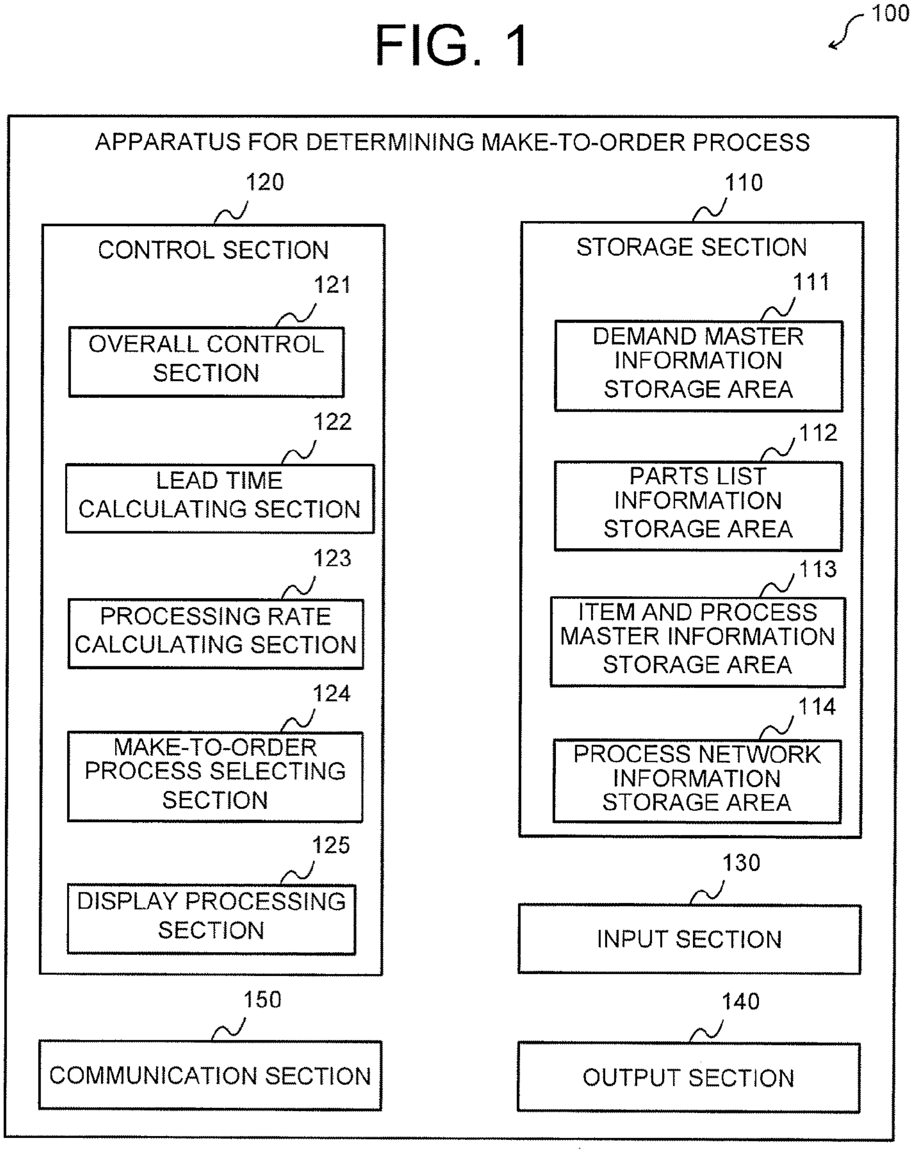
FIG. 1 is a schematic diagram showing an apparatus for determining a make-to-order process 100.

FIG. 1 is a schematic diagram showing the apparatus for determining the make-to-order process 100 according to one embodiment of the present invention. As illustrated, the apparatus for determining the make-to-order process 100 includes a storage section 110, a control section 120, an input section 130, an output section 140, and a communication section 150.

The storage section 110 includes a demand master information storage area 111, a parts list information storage area 112, an item and process master information storage area 113, and a process network information storage area 114.

The demand master information storage area 111 stores demand master information with respect to each product, for specifying a demand rate of a customer and a delivery lead time being allowable. By way of example, in the present embodiment, there is stored a demand master information table 111*a* as shown in FIG. 2 (a schematic diagram showing the demand master information table 111*a*).

The demand master information table 111*a* includes a product field 111*b*, a demand rate field 111*c*, and an allowable delivery lead time field 111*d*.

The product field 111*b* stores information for specifying each product. Here in the present embodiment, there is stored a product ID which is identification information to identify each product uniquely, as information for specifying the product.

The demand rate field 111*c* stores information for specifying a demand rate that indicates a quantity demanded per unit time of the product which is specified by the product field 111*b*. Here in the present embodiment, the unit time is assumed as "day", but it is not limited to this.

The allowable delivery lead time field 111*d* stores information for specifying the delivery lead time (the lead time from order placement to delivery) which is allowable for the product specified in the product field 111*b*.

Referring to FIG. 1 again, the parts list information storage area 112 stores with respect to each product, parts list information for specifying a quantity of the item which constitutes the product. Here in the present embodiment, there is stored a parts list information table 112*a* as shown in FIG. 3 (a schematic diagram of the parts list information table 112*a*).

The parts list information table 112*a* includes a product field 112*b*, an item field 112*c*, and a quantity-per field 112*d*.

The product field 112*b* stores information for specifying each product. Here, in the present embodiment, there is stored a product ID which is identification information to identify each product uniquely, as information for specifying the product.

The item field 112*c* stores information for specifying items which constitute the product specified by the product field 112*b*. Here, in the present embodiment, there is stored an item name as information for specifying the item.

The quantity-per field 112 stores information which specifies a quantity of the item specified by the item field 112*c*, the item being used in the product specified by the product field 112*b*.

It is to be noted that the information stored in the parts list information table 112*a* may be acquired as data generally called as BOM (Bill Of Materials). It is alternatively possible to refer to the BOM data itself instead of the parts list information table 112*a*.

Referring to FIG. 1 again, the item and process master information storage area 113 stores, with respect to each item and process, item and process master information required for calculating an item-by-item process-specific lead time and an item-by-item process-specific processing rate, which will be described later. Here, in the present embodiment, there is stored an item and process master information table 113*a* as shown in FIG. 4 (a schematic diagram of the item and process master information table 113*a*).

The item and the process master information table 113*a* includes a product field 113*b*, an item field 113*c*, a process field 113*d*, a batch size field 113*e*, a cycle time field 113*f*, a manufacturing share field 113$g$, a processing time field 113$h$, a lead time field 113$i$, and a processing rate field 113$j$.

The product field 113$b$ stores information for specifying each product. Here, in the present embodiment, there is stored a product ID being identification information for uniquely identifying each product, as information for specifying the product.

The item field 113$c$ stores information for specifying an item which constitutes a product specified by the product field 113$b$. Here, in the present embodiment, an item name is stored as information for specifying an item.

The process field 113$d$ stores information that specifies a process for processing the item specified in the item field 113$c$, used in the product specified in the product field 113$b$. Here, in the present embodiment, there is stored a process ID being identification information for uniquely identifying each process, as information for specifying the process.

A batch size field 113$e$ stores information for specifying a quantity of the item that is specified by the item field 113$c$, being processed at one time (a batch size) in the process specified by the process field 113$d$.

The cycle time field 113$f$ stores information for specifying a time interval when the quantity of the item corresponding to one batch is subjected to processing in the process specified by the process field 113$d$, the item being specified by the item field 113$c$ (the time interval for charging the items in the process or the time interval for completing the processing in the process).

The manufacturing share field 113$g$ stores information for specifying a ratio of the item that is used in the product specified in the product field 113$b$, the item specified by the item field 113$c$ being processed in the process specified by the process field 113$d$.

The processing time field 113$h$ stores information for specifying a processing time that is taken for processing a quantity of the item corresponding to one batch, in the process specified by the process field 113$d$, the item being specified by the item field 113$c$.

The lead time field 113$i$ stores information for specifying the item-by-item process-specific lead time when the item specified by the item field 113$c$ is processed in the process specified by the process field 113$d$. It is to be noted that the lead time calculating section 122 described below calculates the item-by-item process-specific lead time.

The processing rate field 113$j$ stores information for specifying the item-by-item process-specific processing rate for processing the item specified in the item field 113$c$ in the process specified in the process field 113$d$. It is to be noted that the processing rate calculating section 123 described below calculates the item-by-item process-specific processing rate.

Referring to FIG. 1 again, the process network information storage area 114 stores process network information for specifying a relationship between the processes constituting a manufacturing or shipping process. By way of example, in the present embodiment, there is stored a process network information table 114$a$ as shown in FIG. 5 (a schematic diagram of the process network information table 114$a$).

The process network information table 114$a$ includes a From process field 114$b$, a To process field 114$c$, and a transit time field 114$d$.

The From process field 114$b$ stores information which specifies a process prior to the process that is specified by the To process field 114$c$. Here, in the present embodiment, there is stored a process ID being identification information for uniquely identifying each process, as information for specifying the process.

The To process field 114$c$ stores information for specifying the process subsequent to the process that is specified by the From process field 114$b$. Here, in the present embodiment, there is stored a process ID being identification information for uniquely identifying each process, as information for specifying the process.

The transit time field 114$d$ stores information for specifying a transit time when the item moves from the process specified by the From process field 114$b$ to the process specified by the To process field 114$c$.

Referring to FIG. 1 again, the control section 120 includes an overall control section 121, a lead time calculating section 122, a processing rate calculating section 123, a make-to-order process selecting section 124, and a display processing section 125.

The overall control section 121 controls the entire processing in the apparatus for determining the make-to-order process 100. In the present embodiment, the overall control section 121 performs processing for accepting an input of information for specifying the product as to which a processing is performed for selecting the make-to-order process via the input section 130.

The lead time calculating section 122 acquires necessary information from the parts list information table 112$a$ and the item and process master information table 113$a$, with respect to each item constituting the product as to which the input is accepted by the overall control section 121 and with respect to each process for manufacturing the product, and calculates the item-by-item process-specific lead time by using the following formula (1).

[Formula 1]

$$\text{ITEM-BY-ITEM PROCESS-SPECIFIC LEAD TIME} = \frac{\text{THROUGHPUT}}{\text{BATCH SIZE}} \times \text{CYCLE TIME} + \text{PROCESSING TIME} \quad (1)$$

Here, in the formula (1), the throughput above indicates throughput required in the process for processing the item constituting the product as a calculation target, according to a quantity demanded per unit time of the product as a calculation target (since the quantity demanded indicates the quantity of the product, the throughput is a value obtained by converting the quantity of the product into the quantity of the item treated in the process by using the parts list data), and it is able to be replaced by; demand rate (the quantity of the product demanded per unit time)×quantity-per (the quantity of the item required for one product).

In other words, the item-by-item process-specific lead time in the present embodiment is the time for processing the quantity of the item required for manufacturing the demand quantity of the product which is periodically requested by a customer, and this time is proportional to a value that is obtained by multiplying the demand quantity of the product per unit time, by the quantity of the item included in the product.

Then, the lead time calculation section 122 performs processing for storing a value of the item-by-item process-specific lead time being calculated, in the lead time field 113$i$ of the record whose product, item, and process, being calculation targets, are respectively stored in the product field 113$b$, the item field 113$c$, and the process field 113$d$ of the item and process master information table 113$a$.

The process rate calculating section 123 acquires necessary information from the parts list information table 112$a$ and the item and process master information table 113*a* with respect to each item constituting the product and with respect to each process for manufacturing the product as to which an input is accepted by the overall control section 121, and calculates the item-by-item process-specific processing rate by using the following formula (2).

[Formula 2]

$$\text{ITEM-BY-ITEM PROCESS-SPECIFIC PROCESSING RATE} = \frac{\frac{\text{BATCH SIZE}}{\text{CYCLE TIME}} \times \text{MANUFACTURING SHARE}}{\text{QUANTITY-PER}} \quad (2)$$

In other words, the item-by-item process-specific processing rate in the present embodiment is determined in proportion to a quantity corresponding to the ratio used for manufacturing a particular product, in the quantity of the item processed per unit of time in each process.

Then, the processing rate calculating section 123 performs processing for storing a value of the item-by-item process-specific processing rate being calculated, in the processing rate field 113*j* of the record whose product, item, and process, being calculation targets, are respectively stored in the product field 113*b*, the item field 113*c*, and the process field 113*d* of the item and process master information table 113*a*.

The make-to-order process selecting section 124 selects a process available for the make-to-order, out of the processes for manufacturing the product.

Here, the process available for the make-to-order in the present embodiment is a process which is performed within the delivery lead time allowable by a customer, even though the manufacturing is started after receipt of an order, and it is also a process which is able to handle orders being accepted in succession. In other words, it is required that the process has a processing rate (throughput per unit time) which is sufficient to respond to the demand rate (the demand quantity per unit time). Therefore, in the present invention, the process available for the make-to-order is determined, considering both the relationship between the allowable delivery lead time and the supply lead time, and the relationship between the demand rate and the processing rate.

The processing rate for a series of the overall processes is controlled to be the rate of a process being the slowest among those processes. Therefore, the processing rate for the entire processes for the make-to-order corresponds to the slowest processing rate among the processes for the make-to-order, but the value thereof has to be equal to or higher than the demand rate. Therefore, in the apparatus for determining the make-to-order process 100 in the present embodiment, the demand rate is reflected in calculating the lead time, further considering the magnitude correlation between the demand rate and the processing rate, thereby enabling determination of the make-to-order process that is executable.

As for a specific processing in the make-to-order process selecting process 124, a detailed explanation will be made with reference to FIG. 14.

The display processing section 125 performs processing for outputting to the output section 140, information specifying the make-to-order process selected by the make-to-order selecting section 124, in a predetermined display format (display screen).

The input section 130 accepts inputting of information.

The output section 140 outputs information.

The communicating section 150 transmits and receives information via a network.

Figure 6:
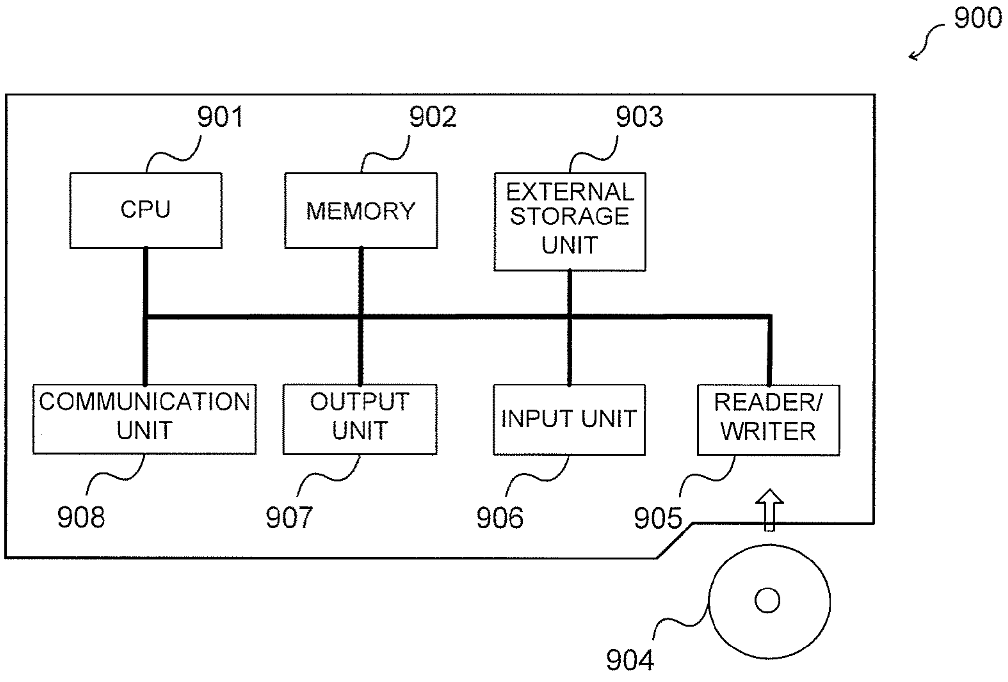
FIG. 6 is a schematic diagram showing a computer 900.

The apparatus for determining make-to-order process 100 may be implemented by a general computer 900, for example as shown in FIG. 6 (a schematic diagram of a computer 900), incorporating a CPU (Central Processing Unit) 901, a memory 902, an external storage unit 903 such as HDD (Hard Disk Drive), a reader/writer 905 for reading information from and writing information to a storage medium 904 being portable such as a CD (Compact Disk) and a DVD (Digital Versatile Disk), an input unit 906 such as a keyboard and a mouse, an output unit 907 such as a display, and a communication unit 908 such as NIC (Network Interface Card) for establishing connection with a communication network.

By way of example, the storage section 110 may be implemented when the CPU 901 utilizes the memory 902 or the external storage unit 903, the control section 120 may be implemented when a predetermined program stored in the external storage unit 903 is loaded on the memory 902 and executed by the CPU 901, the input section 130 may be implemented when the CPU 901 utilizes the input unit 906, the output section 140 may be implemented when the CPU 901 utilizes the output unit 907, and the communication section 150 may be implemented when the CPU 901 utilizes the communication unit 908.

This predetermined program may be downloaded on the external storage unit 903 from the storage medium 904 via the reader/writer 905, or from the network via the communication unit 908, and then it is loaded on the memory 902 and executed by the CPU 901. Alternatively, it may be directly loaded on the memory 902 from the storage medium 904 via the reader/writer 905 or from the network via the communication unit 908, and then executed by the CPU 901.

Figure 7:
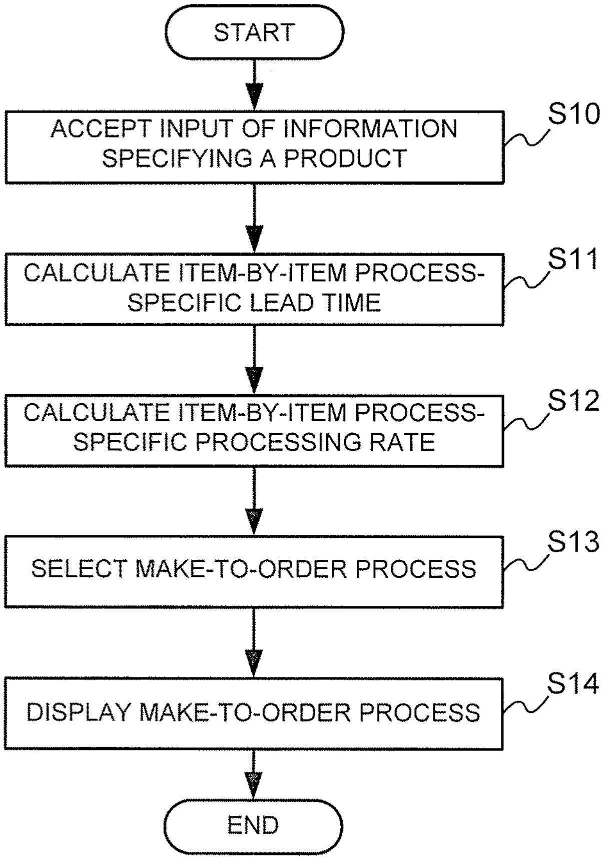
FIG. 7 is a flowchart showing a processing that is carried out in the apparatus for determining the make-to-order process 100.

FIG. 7 is a flowchart showing the processing executed in the apparatus for determining the make-to-order process 100.

Firstly, the overall control section 121 of the apparatus for determining the make-to-order process 100 accepts inputting of information for specifying the product as to which the make-to-order process is selected (S10). Here, inputting of a product ID is accepted as information for specifying the product.

Figure 8:
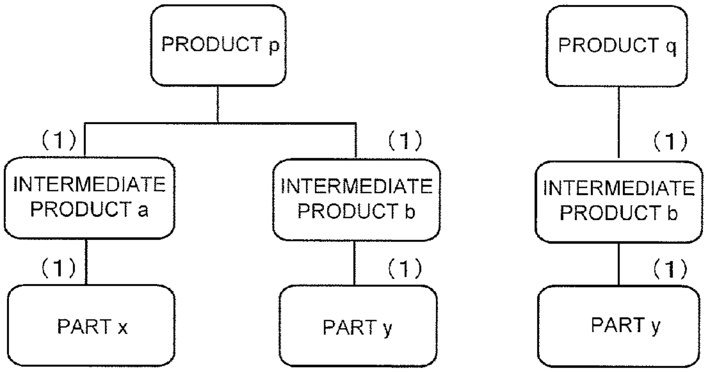
FIG. 8 is a schematic diagram showing structures of product p and product q.

It is assumed that there is inputted information which specifies product p and product q in the step S10 of this flow. Here, as shown in FIG. 8 (a schematic diagram showing structures of product p and product q), as for the product p, an intermediate product a (quantity-per 1) is generated from a part×(quantity-per 1), an intermediate product b (quantity-per 1) is generated from a part y (quantity-per 1), and further the product p is generated from the intermediate product a and the intermediate product b. In addition, as for the product q, as shown in FIG. 8, the intermediate product b is generated from the part y, and further, the product q is generated from the intermediate product b.

Figure 9:
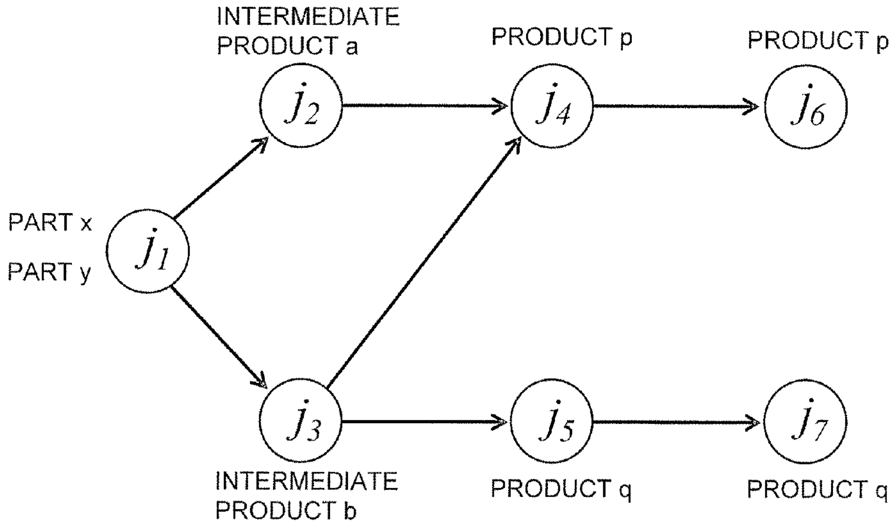
FIG. 9 is a schematic diagram showing a manufacturing process of product p and product q.

As shown in FIG. 9 (a schematic diagram showing the manufacturing processes of product p and product q), the manufacturing process of the product p and the product q incorporates a process $j_1$ for generating a part x and a part y, a process $j_2$ for generating an intermediate product a from the part x, a process $j_3$ for generating an intermediate product b from the part y, a process $j_4$ for generating the product p from the intermediate product a and the intermediate product b, a process $j_5$ for generating the product q from the intermediate product b, a process $j_6$ for completing the product p, and a process $j_7$ for completing the product q, and the process $j_1$ and the process $j_3$ are common processes for both the product p and the product q.

Next, the lead time calculating section 122 of the apparatus for determining the make-to-order process 100 calculates the item-by-item process-specific lead time (S11).

By way of example, the lead time calculating section 122 identifies records which store information specifying the product p and the product q as to which an input is accepted in the step S10, in the product field 111*b* of the demand master information table 111*a*. Then, the demand rates of the product p and the product q, respectively, are acquired from the demand rate field 111*c* of the records being identified.

In addition, the lead time calculating section 122 identifies records storing information that specifies the product p and the product q, as to which inputting is accepted in the step S10, in the product field 112*b* of the parts list information table 112*a*. Then, information specifying items constituting each of the product p and the product q, and information specifying quantity-per of each of the items are acquired from the records being identified.

Furthermore, the lead time calculating section 122 identifies records which stores information that specifies the product p and the product q, as to which inputting is accepted in the step S10, in the product field 113*b* of the item and process master information table 113*a*. Then, from the records being identified, a batch size, a cycle time, and a processing time in each of the processes of the items constituting each of the product p and the product q are specified.

Then, the lead time calculating section 122 calculates the item-by-item process-specific lead time, by substituting the information acquired as described above into the formula (1), with respect to each process as to each of the items which constitute each product.

The lead time calculating section 122 stores the item-by-item process-specific lead time calculated as described above, in the lead time field 113*i* of the record of the item and process master information table 113*a*, the record being associated with the product, item, and process being calculation targets.

Figure 10:
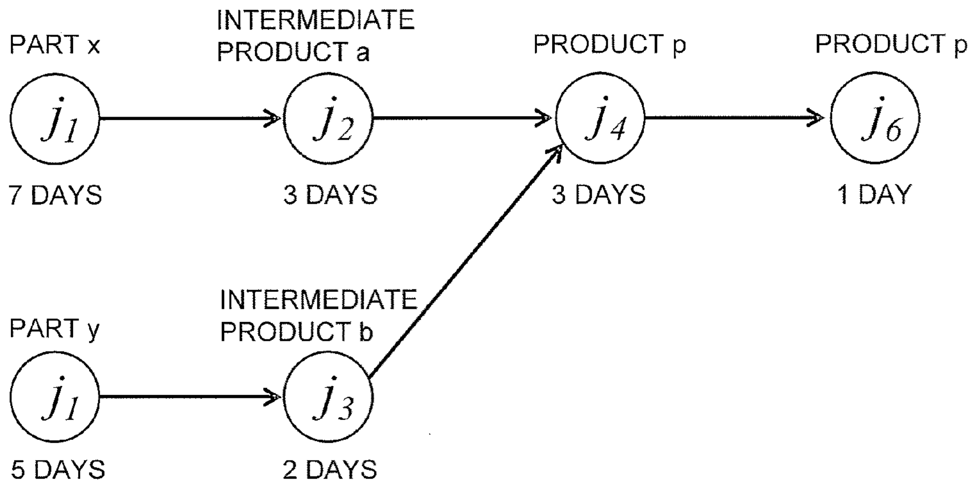
FIG. 10 is a schematic diagram showing an association between an item-by-item process-specific lead time and the process of the product p.
Figure 11:
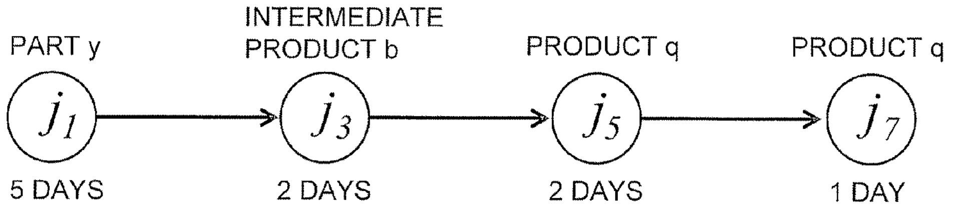
FIG. 11 is a schematic diagram showing an association between the item-by-item process-specific lead time and the process of the product q.

Here, there are shown examples of the item-by-item process-specific lead time calculated by the lead time calculating section 122 in FIG. 10 (a schematic diagram showing the association between the item-by-item process-specific lead time and the process of the product p), and in FIG. 11 (a schematic diagram showing the association between the item-by-item process-specific lead time and the process of the product q).

Next, the processing rate calculating section 123 of the apparatus for determining make-to-order process 100 calculates an item-by-item process-specific processing rate (S12).

By way of example, the processing rate calculating section 123 identifies records which store information specifying the product p and the product q, as to which inputting is accepted in the step S10, in the product field 112*b* of the parts list information table 112*a*. Then, information specifying items constituting each of the product p and the product q and information specifying a quantity-per of each of the items are acquired from the records being identified.

Furthermore, the processing rate calculating section 123 identifies records which store information specifying the product p and the product q, as to which inputting is accepted in the step S10, in the product field 113*b* of the item and process master information table 113*a*. Then, from the records being identified, a batch size, a cycle time, and a processing time in each of the processes of the items constituting each of the product p and the product q are specified.

Then, the lead time calculating section 122 calculates the item-by-item process-specific processing rate by substituting the information acquired as described above into the formula (2), with respect to each process as to each of the items constituting each of the products.

The processing rate calculating section 123 stores the item-by-item process-specific processing rate calculated as described above, in the processing rate field 113*j* of the record in the item and process master information table 113*a*, the record being associated with the product, item, and process as calculation targets.

Figure 12:
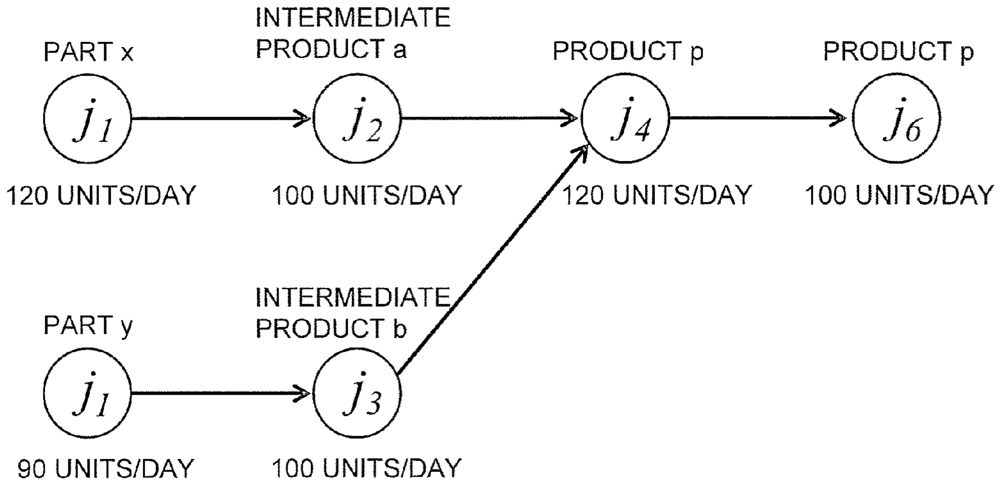
FIG. 12 is a schematic diagram showing an association between an item-by-item process-specific processing rate and the process of the product p.
Figure 13:
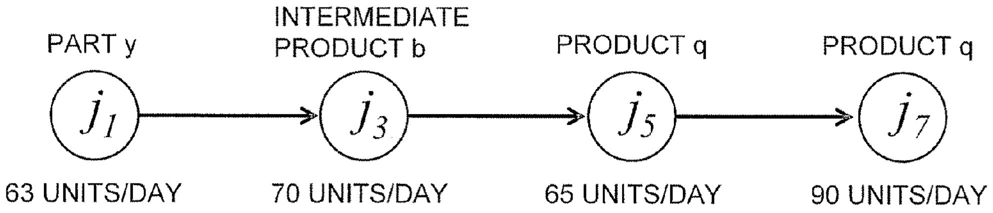
FIG. 13 is a schematic diagram showing an association between the item-by-item process-specific processing rate and the process of the product q.

Here, there are shown examples of the item-by-item process-specific processing rate calculated by the processing rate calculating section 123 in FIG. 12 (a schematic diagram showing the association between the item-by-item process-specific processing rate and the process of the product p), and in FIG. 13 (a schematic diagram showing the association between the item-by-item process-specific processing rate and the process of the product q).

Next, the make-to-order process selecting section 124 of the apparatus for determining make-to-order process 100 performs processing for selecting the make-to-order process (S13). It is to be noted that as for the processing for selecting the make-to-order process in the step S13, a detailed explanation will be made with reference to FIG. 14.

Figure 14:
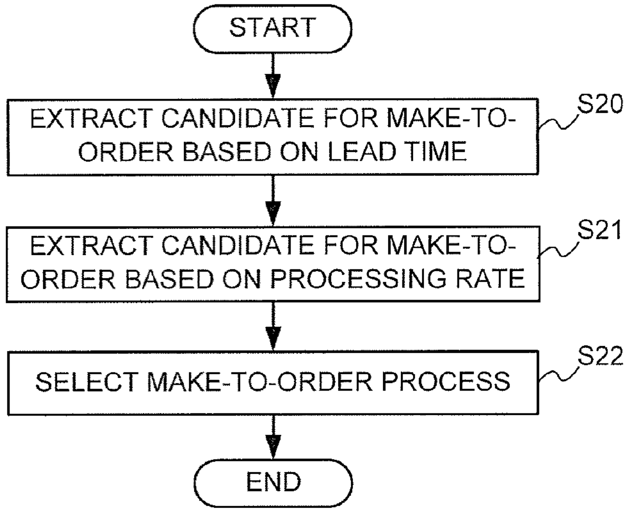
FIG. 14 is a flowchart showing a processing for selecting the make-to-order process.

FIG. 14 is a flowchart showing the processing for selecting the make-to-order process.

Firstly, the make-to-order process selecting section 124 extracts a candidate for the make-to-order process, according to the item-by-item process-specific lead time calculated in the step S11 as shown in FIG. 7 (S20).

By way of example, the make-to-order process selecting section 124 identifies records which store information specifying the product p and the product q, as to which inputting is accepted in the step S10 of FIG. 7, in the product field 113*b* of the item and process master information table 113. Then, extracting the process ID stored in the process field 113*d* of the identified record for each product, searching the From process field 114*b* and the To process field 114*c* of the process network information table 114*a* for the process ID being extracted, and repeating the processing for specifying a link between a previous process and a subsequent process with respect to each product, whereby all the process IDs extracted for each product are linked, and a process flow is identified.

It is further possible that when the process flow is identified, the aforementioned BOM information and information for specifying a parent-child relationship between the parts (intermediate products, materials) are stored in the storage section 110, and those information items are made available for reference. Alternatively, the storage section 110 may store in advance the process flow as to each product.

In the process flow of each specified product, the make-to-order process selecting section 124 extracts from the lead time field 113*i* of the item and process master information table 113*a*, a value of the item-by-item process-specific lead time being associated with the product and the process, and further extracts the transit time between each of the processes from the transit time field 114*d* of the process network information table 114*a*, sequentially accumulates (totalizes) those extracted values of the item-by-item process specific lead time of each process and the transit time between the processes, from the lowermost stream, directing to the upper stream of the process flow for each product, and selects as the make-to-order process candidate of the product, the process in the range which does not go over the allowable delivery lead time of the product stored in the allowable delivery lead time field 111*d* of the demand master information table 111*a*.

Figure 15:
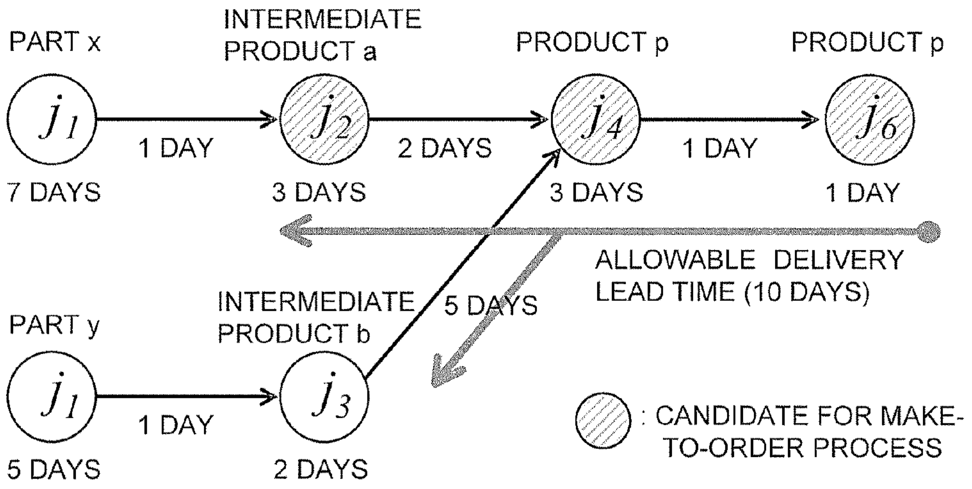
FIG. 15 is a schematic diagram showing an example for selecting the process that satisfies an allowable lead time of the product p.

Here, there is shown an example for selecting the process which satisfies the allowable lead time of the product p in FIG. 15 (a schematic diagram showing an example for selecting a process satisfying the allowable lead time of the product p).

Firstly, the make-to-order selecting section 124 checks the allowable delivery lead time of the product p in the demand master information table 111*d*, and specifies that the value of the allowable delivery lead time is 10 days.

Then, the make-to-order process selecting section 124 specifies the item-by-item process-specific lead time of each process and the transit time between the processes from the item and process master information table 113*a* and the process network information table 114*a*, sequentially from the lowermost stream $j_6$ directing to an upper stream process ($j_6 \rightarrow j_4 \rightarrow j_2 \rightarrow j_1$, $j_6 \rightarrow j_4 \rightarrow j_3 \rightarrow j_1$), and each of the data items is accumulated. Then, a process is specified, whose additional value obtained by addition from the lowermost stream directing to the upper stream becomes equal to or less than the allowable delivery lead time "10 days" of the product p. In the example of FIG. 15, it is specified that the processes starting from the process $j_2$ correspond to an accumulated process being equal to or less than the allowable delivery lead time in the process flow of $j_1 \rightarrow j_2 \rightarrow j_4 \rightarrow j_6$. In the process flow of $j_1 \rightarrow j_3 \rightarrow j_4 \rightarrow j_6$, the processes starting from $j_4$ correspond to an accumulated process being equal to or less than the allowable delivery lead time.

Figure 16:
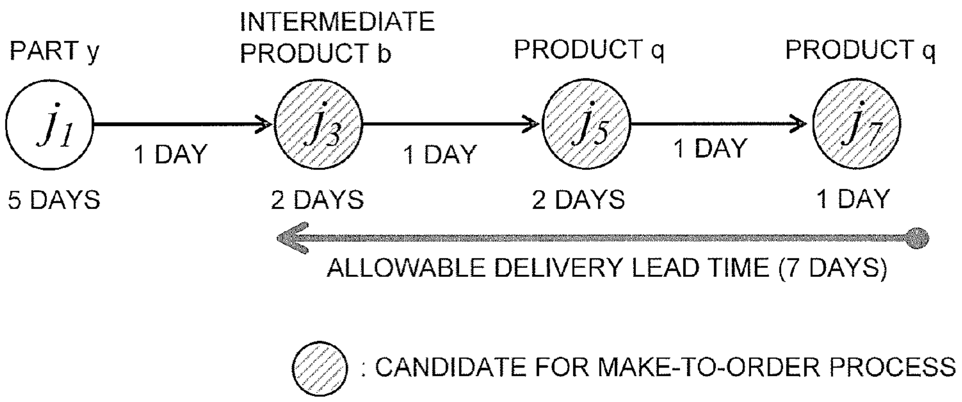
FIG. 16 is a schematic diagram showing an example for selecting the process that satisfies the allowable lead time of the product q.

Furthermore, there is shown an example of selecting a process which satisfies the allowable lead time of the product p in FIG. 16 (a schematic diagram showing an example for selecting the process satisfying the allowable lead time of the product q).

Firstly, the make-to-order process selecting section 124 checks the allowable delivery lead time of the product q in the demand master information table 111*d*, and specifies that the value of the allowable delivery lead time is "7 days".

Then, the make-to-order process selecting section 124 specifies the item-by-item process-specific lead time of each process and the transit time between the processes, from the item and process master information table 113*a* and the process network information table 114*a*, sequentially from the lowermost stream $j_7$ directing to the upper stream process ($j_7 \rightarrow j_5 \rightarrow j_3 \rightarrow j_1$), and each of the data items is accumulated. Then, a process is specified, whose additional value obtained by addition from the lowermost stream directing to the upper stream becomes equal to or less than the allowable delivery lead time "7 days" of the product q. In the example of FIG. 16, it is specified that the processes starting from $j_3$ correspond to an accumulated process being equal to or less than the allowable delivery lead time.

Next, the make-to-order process selecting section 124 extracts a candidate for the make-to-order process according to the item-by-item process-specific processing rate calculated in the step S12 of FIG. 7 (S21).

By way of example, in the process flow of each product specified in the step S21, the make-to-order process selecting section 124 extracts from the processing rate field 113*j* of the item and process master information table 113*a*, a value of the item-by-item process-specific processing rate being associated with the product and the process, and further specifies from the demand master information table 111, a value of the demand rate of each product specified in the step S21.

Then, the make-to-order process selecting section 124 selects as a make-to-order process candidate, a process starting from the process subsequent to the process where a value of the extracted item-by-item process-specific processing rate is lower than the demand rate of the product.

Figure 17:
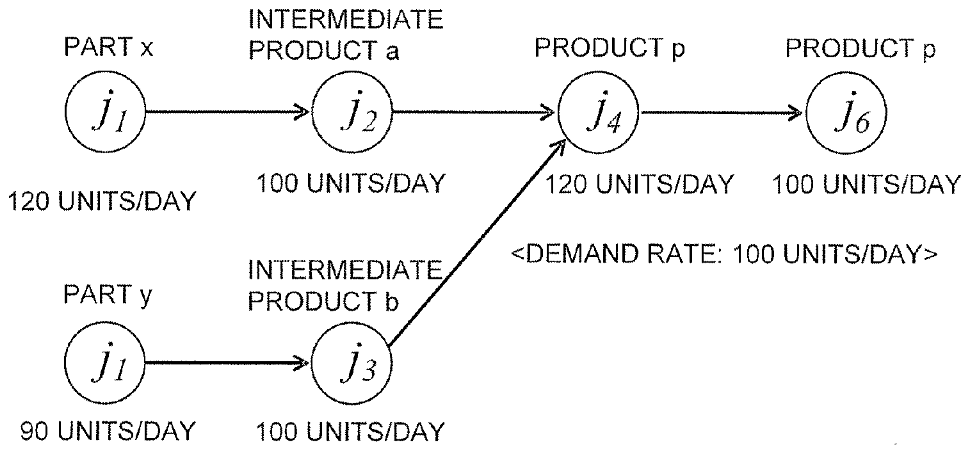
FIG. 17 is a schematic diagram showing an example for selecting a process starting from the process subsequent to the process that does not satisfy the demand rate of the product p.

Here, there is shown an example for selecting a process, starting from the process subsequent to the process that does not satisfy the demand rate of the product p in FIG. 17 (a schematic diagram showing an example for selecting a process starting from the process subsequent to the process that does not satisfy the demand rate of the product p).

Firstly, the make-to-order process selecting section 124 checks the demand rate of the product p in the demand master information table 111*d*, and specifies that a value of the demand rate is 100 units per day.

Then, the make-to-order process selecting section 124 specifies a value of the processing rate of each of the processes included in the process flow of the product p, from the processing rate field 113*j* of the item and process master information table 113*a*, and specifies the process having the processing rate lower than the demand rate of the product p. Here in the example of FIG. 17, since there is no process having the processing rate lower than the demand rate of the product p, no candidates are extracted.

Figure 18:
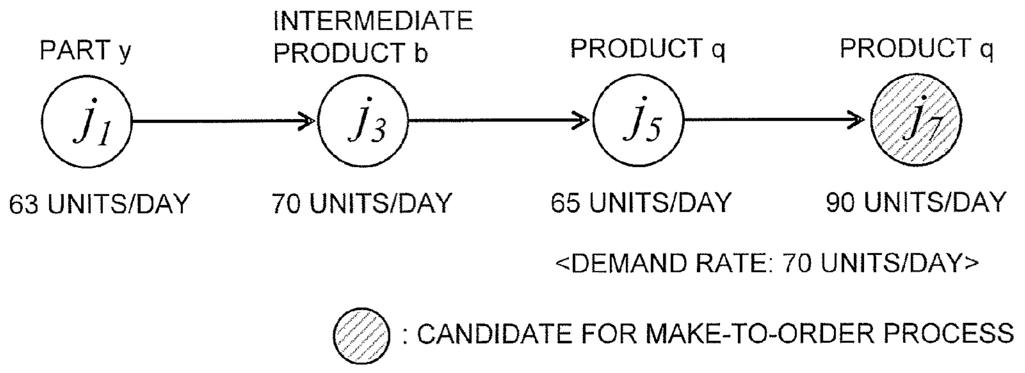
FIG. 18 is a schematic diagram showing an example for selecting a process starting from the process subsequent to the process that does not satisfy the demand rate of the product q.

In addition, there is shown an example for selecting a process, starting from the process subsequent to the process that does not satisfy the demand rate of the product q in FIG. 18 (a schematic diagram showing an example for selecting a process, starting from the process subsequent to the process that does not satisfy the demand rate of the product q).

Firstly, the make-to-order process selecting section 124 checks the demand rate of the product q in the demand master information table 111*d*, and specifies that a value of the demand rate is 70 units per day.

Then, the make-to-order process selecting section 124 specifies a value of the processing rate of each of the processes included in the process flow of the product q, from the processing rate field 113*j* of the item and process master information table 113*a*, and further specifies the process having the processing rate lower than the demand rate of the product q. Here in the example of FIG. 18, the processing rate of the process $j_5$ is 65 units per day, and it is lower than the demand rate of the product q.

Consequently, the make-to-order process selecting section 124 selects as the make-to-order process candidate, the process starting from the process $j_7$ that is next to the process $j_5$ in the process flow of the product q.

It is to be noted that when there are more than one process that does not satisfy the demand rate of the product, a process starting from the process subsequent to the process that is located in the lower stream, is selected as a candidate for the make-to-order process.

Next, the make-to-order process selecting section 124 selects a candidate, which is extracted in the step S21 and which is also extracted in the step S22, as the make-to-order process (S22). It is to be noted that if the product does not include the process having the processing rate that does not satisfy the demand rate of the product in the step S22, the candidate extracted in the step S21 is selected as the make-to-order process.

In other words, if the candidate extracted in the step S21 includes a process, starting from the process subsequent to the process having the processing rate not satisfying the product demand rate (if such process is more than one, the lowermost stream process), the make-to-order process selecting section 124 selects the process starting from the process subsequent to this not-satisfying process, as the make-to-order process.

Figure 19:
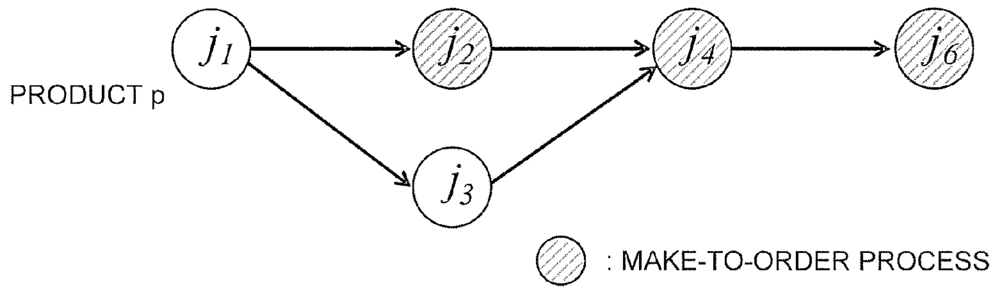
FIG. 19 is a schematic diagram showing the make-to-order process selected for the product p.

By way of example, as shown in FIG. 19 (a schematic diagram showing the make-to-order process selected for the product p), the product p does not include the product having the processing rate lower than the demand rate in the step S21. Therefore, the process $j_2$, the process $j_4$, and the process $j_6$, being candidates in the step S20, are selected as the make-to-order processes.

Figure 20:
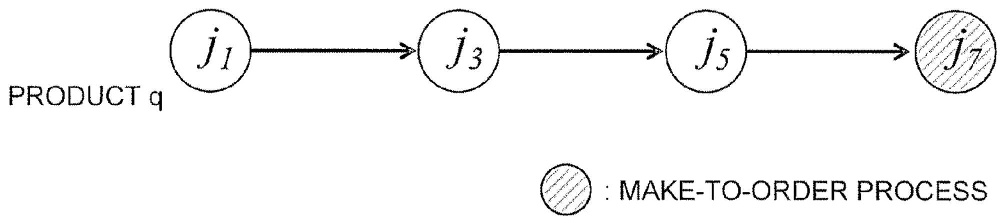
FIG. 20 is a schematic diagram showing the make-to-order process selected for the product q.

Further as shown in FIG. 20 (a schematic diagram showing the make-to-order process selected for the product q), the process $j_3$, the process $j_5$, and process $j_7$ are selected as the candidates for the product q in the step S20, and the process $j_7$ becomes the candidate in the step S21. Therefore, the process $j_7$ being the common part is selected as the make-to-order process.

The make-to-order process being selected as described above is executable from the viewpoint both in the relationship between the allowable delivery lead time and the supply lead time, and the relationship between the demand rate and the processing rate. Accordingly, it is possible to accomplish the production without failing in meeting the deadline, even though the manufacturing is started after receipt of an order from the customer.

Referring to FIG. 7 again, in the step S14, the display processing section 125 performs processing for configuring a predetermined display screen based on the information which specifies the make-to-order process selected by the make-to-order process selecting section 124 and outputting the display screen to the output section 140.

Here, the display screen outputted to the output section 140 may display all the processes included in the process flow of each product in the form of diagram as shown in FIG. 19 and FIG. 20, and perform display processing such as giving a particular color to or filling with a particular manner in the part of diagram which displays the make-to-order process selected by the make-to-order selecting section 124, thereby allowing the selected make-to-order process to be identified.

It is to be noted that in this kind of diagram, as shown in FIG. 15 and FIG. 16, a value of the item-by-item process-specific lead time may be displayed at a position adjacent to the part of diagram indicating the associated process. In addition, as shown in FIG. 17 and FIG. 18, a value of the item-by-item process-specific processing rate may be displayed at a position adjacent to the part of diagram indicating the associated process (and it is also possible to display both values).

Figure 21:
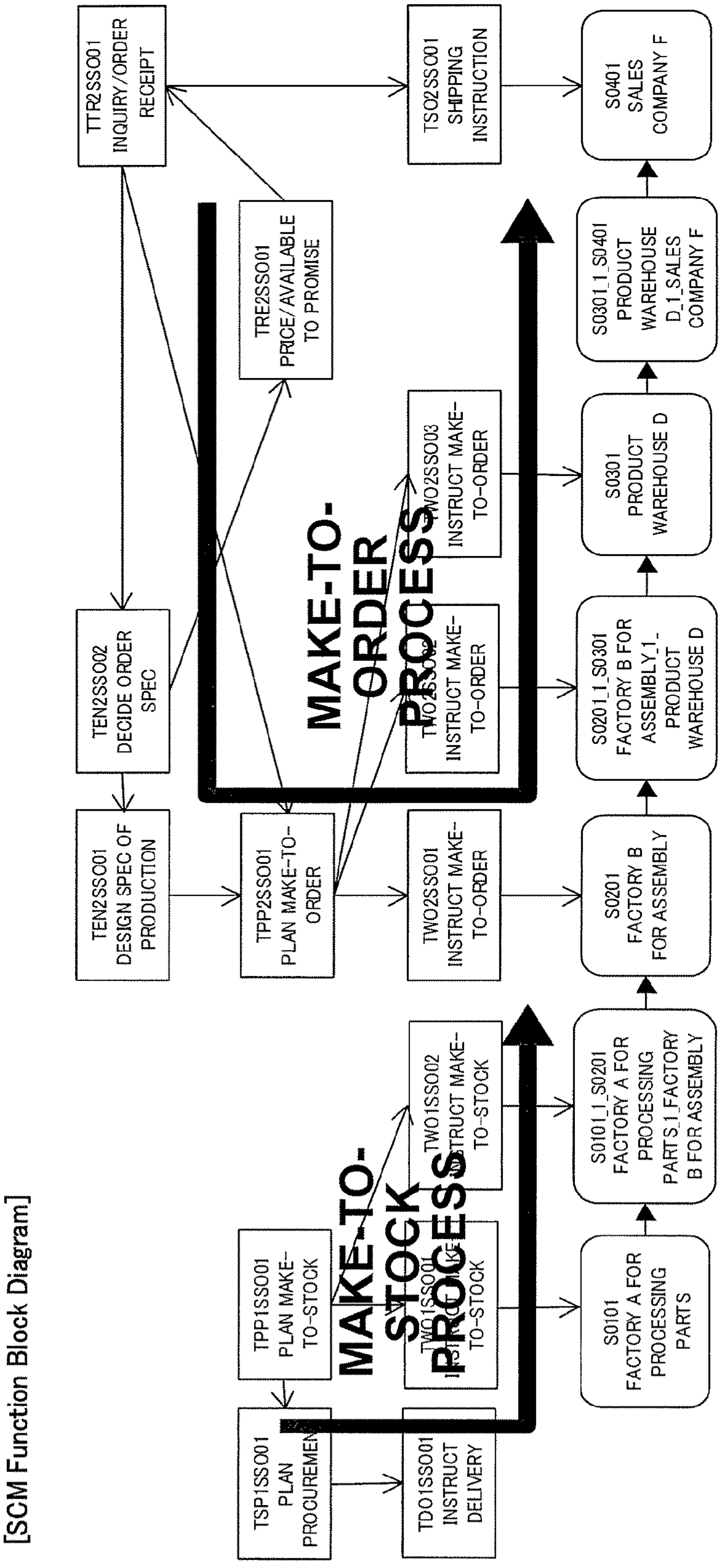
FIG. 21 is a schematic diagram of a display screen 160.

As shown in FIG. 21 (a schematic diagram of the display screen 160), it is further possible to configure such that in each part of diagram indicating each process, a description regarding the processing performed in each process and the location thereof (it is assumed that such information is stored in the storage section 110) are displayed, and particular signs (arrows in FIG. 21) are used to discriminate between the process included in the make-to-order process and the process included in the make-to-stock process which is not included in the make-to-order process.

As described above, according to the present invention, the demand rate is reflected to the lead time calculation, and magnitude correlation between the demand rate and the processing rate is considered, thereby enabling decision of make-to-order process which is executable.

In the embodiment as described above, the apparatus for determining the make-to-order process 100 performs all the processing, but this is not the only example. For example, it is further possible to configure a system which determines the make-to-order process, by using multiple apparatuses which are able to send and receive information one another via a network, whereby the processing performed by the apparatus for determining make-to-order process 100 may be conducted in dispersed manner. In particular, with regard to the information stored in the storage section 110, it is possible to acquire the information stored in other storage unit via the network.

In the embodiment described above, the item-by-item process-specific lead time is calculated according to the formula (1). However, this is not the only example, and it is possible to add to the formula (1), a particular time required for preparing each process and the like, as a correction time.

In the embodiment described above, the make-to-order process is selected based on a candidate which satisfies conditions both of the candidate for the make-to-order process based on the lead time specified in the step S22 of FIG. 14 and of the candidate for the make-to-order process based on the processing rate specified in the step S21. However, this is not the only example, and it is further possible to select either one of the following candidates; the candidate for the make-to-order process based on the lead time specified in the step S22 of FIG. 14 and the candidate for the make-to-order process based on the processing rate specified in the step S21.

What is claimed is:

1. An apparatus for determining a make-to-order process, for selecting from a process flow specifying a sequence of processes for manufacturing a product, a process for manufacturing after receipt of an order of the product, comprising, a storage section for storing, demand master information for specifying with respect to each product, an allowable delivery lead time that is allowed by a customer as a period from placing the order to delivering the product, and process network information for specifying a transit time of an item between the processes, and a control section, wherein, the control section performs processing of;

calculating, with respect to each process for manufacturing the product, a process-specific lead time being proportional to a time length for processing a quantity of the item required for producing a quantity demanded, as to the product whose order is periodically received, calculating an additional value obtained by adding the process-specific lead time calculated for one process and a transit time between the one process and a previous process of the one process, sequentially from the lowermost stream process to an upper stream process of the process flow, so as to specify the one process which makes the additional value equal to or less than the allowable delivery lead time that is specified by the demand master information, and selecting a process starting from the one process being specified, as the make-to-order process within the process flow.

2. The apparatus for determining the make-to-order process according to claim 1, wherein, the storage section stores, parts list information for specifying, with respect to each product, the item constituting the product and a quantity of the item constituting the product, item and process master information for specifying, with respect to each product, each item constituting the product, and each process for processing the item, a batch size being a quantity of the item to be processed at one time in the process, a cycle time being a time interval for one-time processing in the process, and a processing time taken for the one-time processing in the process, the demand master information includes, with respect to each product, information for specifying a demand rate being a quantity demanded, as to which an order of the product is received periodically within a unit time, and the control section obtains a value as the process-specific lead time, according to a calculation; dividing by the batch size, a value obtained by multiplying the demand rate by the quantity of the item constituting the product, a resulting value is multiplied by the cycle time, and then the processing time is added thereto.

3. The apparatus for determining the make-to-order process according to claim 1, wherein, the demand master information includes with respect to each product, information for specifying demand rate being a quantity demanded, as to which an order of the product is periodically received within a unit of time, and the control section performs the processing of;

calculating, with respect to each process for manufacturing the product, a process-specific processing rate which is proportional to a quantity corresponding to a ratio of the item used for manufacturing the product, in the quantity of the item processed in the unit of time, specifying a process having the process-specific processing rate lower than the demand rate, and when a process next to the process with lower rate than the demand rate is included in the process starting from the one process being specified, within the process flow, selecting as the make-to-order process, a process starting from the process next to the process with lower rate.

4. The apparatus for determining the make-to-order process according to claim 3, wherein, the storage section stores, parts list information for specifying, with respect to each product, the item constituting the product and a quantity of the item constituting the product, and item and process master information for specifying, with respect to each product, each item constituting the product, and each process for processing the item, a batch size being a quantity of the item to be processed at one time in the process, a cycle time being a time interval for one-time processing in the process, and a manufacturing ratio of the item used for the product, to the item processed in the process, and the control section obtains a value as the process-specific processing rate, according to a calculation; dividing the batch size by the cycle time, a resulting value is multiplied by the manufacturing ratio, and then divided by the quantity of the item constituting the product.

5. A program stored on a non-transitory computer readable medium for allowing a computer to function as an apparatus for determining a make-to-order process, for selecting from a process flow specifying a sequence of processes for manufacturing a product, a process for manufacturing after receipt of an order of the product, the program allowing the computer to function as, a storage means for storing, demand master information for specifying with respect to each product, an allowable delivery lead time that is allowed by a customer as a period from placing the order to delivering the product, and process network information for specifying a transit time of an item between the processes, and a control means, wherein, the control means performs processing of;

calculating, with respect to each process for manufacturing the product, a process-specific lead time being proportional to a time length for processing a quantity of the item required for producing a quantity demanded as to the product whose order is periodically received, calculating an additional value obtained by adding the process-specific lead time calculated for one process, and a transit time between the one process and a previous process of the one process, sequentially from the lowermost stream process to an upper stream process of the process flow, so as to specify the one process which makes the additional value equal to or less than the allowable delivery lead time that is specified by the demand master information, and selecting a process starting from the one process being specified, as the make-to-order process, within the process flow.

6. The program according to claim 5, further allowing the storage means to store, parts list information for specifying, with respect to each product, the item constituting the product and a quantity of the item constituting the product, and item and process master information for specifying, with respect to each product, each item constituting the product, and each process for processing the item, a batch size being a quantity of the item to be processed at one time in the process, a cycle time being a time interval for one-time processing in the process, and a processing time taken for the one-time processing in the process, wherein, the demand master information includes information for specifying a demand rate being a quantity demanded, as to which an order of the product is received periodically within a unit time, and the program allows the control means to obtain a value as the process-specific lead time, according to a calculation; dividing by the batch size, a value obtained by multiplying the demand rate by the quantity of the item constituting the product, a resulting value is multiplied by the cycle time, and then the processing time is added thereto.

7. The program according to claim 5, wherein, the demand master information includes, with respect to each product, information for specifying a demand rate being a quantity demanded as to which an order of the product is periodically received within a unit of time, and the program allows the control means to perform the processing of;

calculating, with respect to each process for manufacturing the product, a process-specific processing rate which is proportional to a quantity corresponding to a ratio of the item used in manufacturing the product, in the quantity of the item processed in the unit of time, specifying a process having the process-specific processing rate lower than the demand rate, and when a process next to the process with a lower rate than the demand rate is included in the process starting from the one process being specified, within the process flow, selecting as the make-to-order process, a process starting from the process next to the process with the lower rate.

8. The program according to claim 7, further allowing the storage means to store, parts list information for specifying, with respect to each product, the item constituting the product and a quantity of the item constituting the product, and item and process master information for specifying, with respect to each product, each item constituting the product, and each process for processing the item, a batch size being a quantity of the item to be processed at one time in the process, a cycle time being a time interval for one-time processing in the process, and a manufacturing ratio of the item used for the product, to the item processed in the process, wherein, the program allow the control section to obtain a value as the process-specific processing rate, according to a calculation; dividing the batch size by the cycle time, a resulting value is multiplied by the manufacturing ratio, and then divided by the quantity of the item constituting the product.

9. A system for determining a make-to-order process, for selecting from a process flow specifying a sequence of processes for manufacturing a product, a process for manufacturing after receipt of an order of the product, comprising, a storage section for storing, demand master information for specifying with respect to each product, an allowable delivery lead time that is allowed by a customer as a period from placing the order to delivering the product, and process network information for specifying a transit time of an item between the processes, and a control section, wherein, the control section performs processing of;

calculating, with respect to each process for manufacturing the product, a process-specific lead time being proportional to a time length for processing a quantity of the item required for producing a quantity demanded as to the product whose order is periodically received, calculating an additional value obtained by adding the process-specific lead time calculated for one process, and a transit time between the one process and a previous process of the one process, sequentially from the lowermost stream process to an upper stream process of the process flow, so as to specify the one process which makes the additional value equal to or less than the allowable delivery lead time that is specified by the demand master information, and selecting a process starting from the one process being specified, as the make-to-order process, within the process flow.

10. The system for determining the make-to-order process, according to claim 9, wherein, the storage section stores, parts list information for specifying, with respect to each product, the item constituting the product and a quantity of the item constituting the product, and item and process master information for specifying, with respect to each product, each item constituting the product, and each process for processing the item, a batch size being a quantity of the item to be processed at one time in the process, a cycle time being a time interval for one-time processing in the process, and a processing time taken for the one-time processing in the process, wherein, the demand master information includes, with respect to each product, information for specifying a demand rate being a quantity demanded, as to which an order of the product is received periodically within a unit time, and the control means obtains a value as the process-specific lead time, according to a calculation; dividing by the batch size, a value obtained by multiplying the demand rate by the quantity of the item constituting the product, a resulting value is multiplied by the cycle time, and then the processing time is added thereto.

11. The system for determining the make-to-order process, according to claim 9, wherein, the demand master information includes with respect to each product, information for specifying demand rate being a quantity demanded as to which an order of the product is periodically received within a unit of time, and the control section performs the processing of;

calculating, with respect to each process for manufacturing the product, a process-specific processing rate which is proportional to a quantity corresponding to a ratio of the item used in manufacturing the product, to the quantity of the item processed in the unit of time, specifying a process having the process-specific processing rate lower than the demand rate, and when a process next to the process with lower rate than the demand rate is included in the process starting from the one process being specified, within the process flow, selecting as the make-to-order process, a process starting from the process next to the process with lower rate.

12. The system for determining the make-to-order process, according to claim 11, wherein, the storage section stores, parts list information for specifying, with respect to each product, the item constituting the product and a quantity of the item constituting the product, and item and process master information for specifying, with respect to each product, each item constituting the product, and each process for processing the item, a batch size being a quantity of the item to be processed at one time in the process, a cycle time being a time interval for one-time processing in the process, and a manufacturing ratio of the item used for the product, to the item processed in the process, and the control section obtains a value as the process-specific processing rate, according to a calculation; dividing the batch size by the cycle time, a resulting value is multiplied by the manufacturing ratio, and then divided by the quantity of the item constituting the product.

* * * * *